(12) United States Patent
Tallone et al.

(10) Patent No.: US 7,068,420 B2
(45) Date of Patent: Jun. 27, 2006

(54) LOW COST OPTICAL AMPLIFIER

(76) Inventors: Luigi Tallone, Agilent Technologies Italia, Via G. Reiss Romoli, 274, 10148 Torino (IT); Carlo De Bernardi, Agilent Technologies Italia, Via G. Reiss Romoli, 274, 10148 Torino (IT)

( * ) Notice: Subject to any disclaimer, the term of this patent is extended or adjusted under 35 U.S.C. 154(b) by 0 days.

(21) Appl. No.: 11/181,307

(22) Filed: Jul. 14, 2005

(65) Prior Publication Data

US 2006/0012853 A1   Jan. 19, 2006

(30) Foreign Application Priority Data

Jul. 14, 2004   (GB) ................................. 0415711.1

(51) Int. Cl.
*H01S 3/00* (2006.01)
*G02B 6/10* (2006.01)
(52) U.S. Cl. .................. 359/333; 359/345; 385/132
(58) Field of Classification Search ................ 359/333, 359/345, 342; 385/132
See application file for complete search history.

(56) References Cited

U.S. PATENT DOCUMENTS

| 6,236,793 B1 * | 5/2001 | Lawrence et al. ........... 385/132 |
| 6,643,059 B1 | 11/2003 | Grant et al. ............ 359/341.32 |
| 6,785,304 B1 * | 8/2004 | Filgas .......................... 372/19 |
| 6,894,828 B1 * | 5/2005 | Pelouch et al. .............. 359/333 |
| 2001/0043387 A1 | 11/2001 | Lawrence et al. ........... 359/333 |

FOREIGN PATENT DOCUMENTS

| WO | WO 03/065093 A1 | 8/2003 |
| WO | WO 2004/044634 A1 | 5/2004 |

* cited by examiner

*Primary Examiner*—Mark Hellner

(57) ABSTRACT

An optical amplifier includes a substrate having disposed thereon an optical waveguide, the optical waveguide having an active region with Si nanocrystals dispersed in an erbium doped glass matrix. A light source is arranged to irradiate the optical waveguide with pump electromagnetic radiation. The amplifier also includes means for suitably shaping an input electromagnetic field to be amplified into the active region of the optical waveguide.

14 Claims, 5 Drawing Sheets

LOW COST OPTICAL AMPLIFIER

CROSS-REFERENCE TO RELATED APPLICATIONS

This application claims priority from British Patent Application No. 0415711.1, filed on Jul. 14, 2004.

The present invention relates to an improved low cost optical amplifier. More specifically the present invention relates to an LED pumped Silicon (Si) nanocluster erbium doped optical amplifier.

BRIEF DESCRIPTION OF RELATED DEVELOPMENTS

Erbium doped optical amplifiers have been used for many years in optical telecommunications networks to boost the strength of an optical signal as it is transmitted along a fiber. While there are many different types of these amplifiers, they all typically rely on relatively expensive single wavelength lasers as the pumping sources. It has been recently shown that in some specially prepared erbium doped optical waveguides, such as silica layers containing Si nanocrystals or nanoclusters dispersed in the erbium doped glass matrix, that the erbium can be efficiently excited using light sources which emit over a broad wavelength range in the visible portion of the electromagnetic spectrum. Light emitting diodes (LEDs) have been used as a low cost pumping source for these types of amplifiers as there is no longer a strict requirement on the pumping wavelength as is the case in standard erbium doped glass. Such an arrangement has been discussed in a paper by Jinku Lee and Jung H. Shun entitled "Optical gain at 1.5 microns in nanocrystal Si sensitized erbium doped silica waveguide using top-pumping 470 nm LEDs" presented at the 2004 OFC meeting. Here an array of LEDs was used to pump a section of erbium doped silica waveguide, which had been sensitized with Si nanocrystals.

However, as in the case above, the much lower radiance of the LED, compared to a laser, places a limitation on the efficiency in which the pump power can be transferred to the active medium of the waveguide and consequently on the output power of the amplifier. Thus for a given length of fiber in a communications network, more LED based amplifiers would be required thereby negating any cost savings over laser based amplifiers.

SUMMARY OF THE DISCLOSED EMBODIMENTS

The present invention overcomes the above-mentioned limitations by providing an optical amplifier with increased output power by enabling an almost complete transfer of optical power from the LED source to the active medium in the waveguide.

This is achieved according to the present invention by providing an optical amplifier comprising a substrate having disposed thereon an optical waveguide, the optical waveguide having an active region, a light source arranged to irradiate the optical waveguide with pump electromagnetic radiation, and means for suitably shaping an input electromagnetic signal to be amplified into the active region of the optical waveguide, wherein the irradiation of the optical waveguide is orthogonal to the plane of propagation of the signal.

Advantageously the present invention offers a compact low cost optical amplifier for use in telecommunications networks. In addition, the optical amplifier of the present invention is arranged in a lateral pumping configuration, which provides more flexibility in the arrangement of the pump sources. Furthermore, the amplifier of the present invention maintains the single mode characteristics of the amplified signal.

BRIEF DESCRIPTION OF THE DRAWINGS

While the principal features and advantages of the present invention have been described above, a more detailed understanding can be obtained by referring to the figures and detailed description which follows where.

DETAILED DESCRIPTION OF THE PREFERRED EMBODIMENTS

Figure 1B:
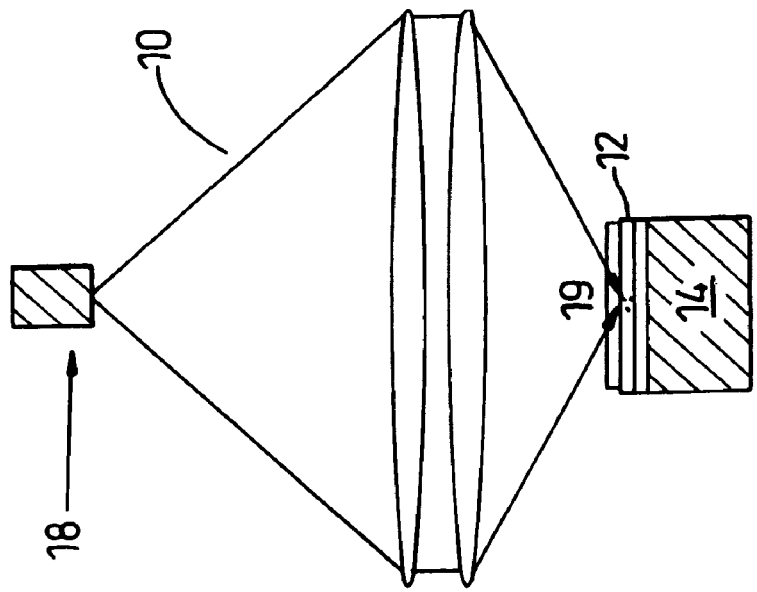
FIGS. 1a and 1b show a known laterally laser pumped optical amplifier.
Figure 1A:
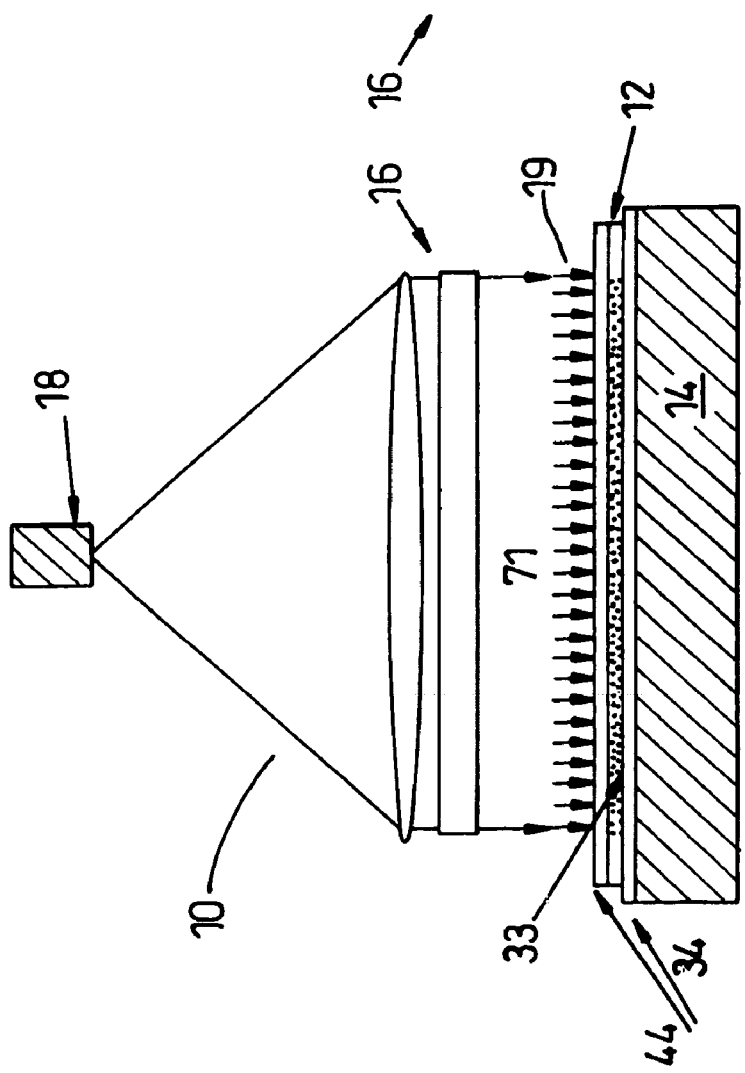

In FIGS. 1a and 1b schematics are shown of a laterally laser-pumped optical amplifier 10, based on Si nanocluster erbium doped active waveguide 12. The waveguide is disposed on substrate 14. Due to the extremely high absorption coefficient of the doped waveguide, longitudinal pumping is not practical, as only few micrometers of the waveguide would be effectively pumped. Therefore, a complex, anamorphic optical system 16 is required to transform the output beam from the laser 18 into a narrow, straight line 19, to achieve a sufficient and stable coupling efficiency to the active waveguide.

Figure 2B:
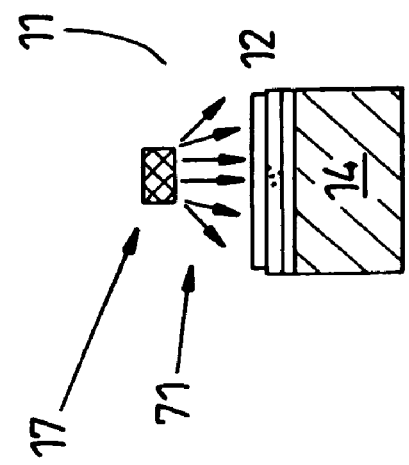
FIGS. 2a and 2b show a known LED pumped optical amplifier.
Figure 2A:
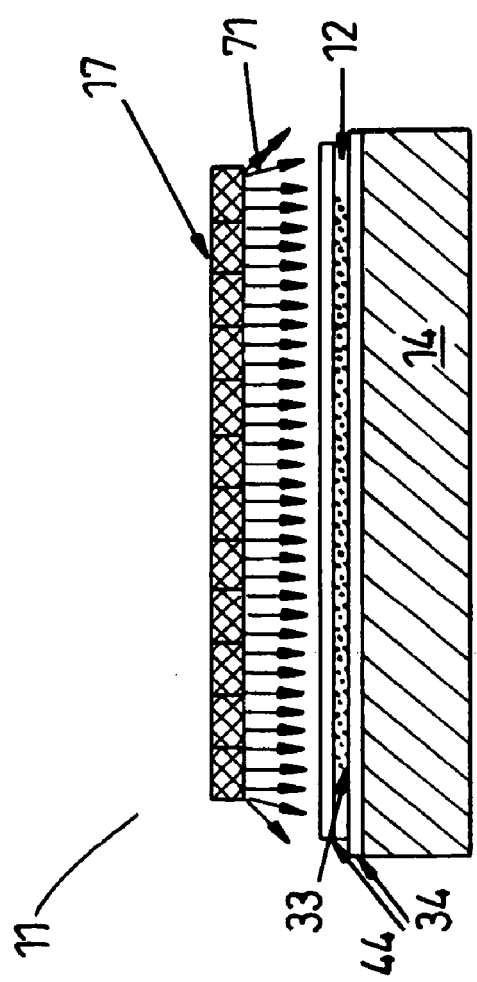

In FIGS. 2a and 2b, where parts also appearing in FIGS. 1a and 1b bear identical numerical designation, an LED-pumped optical amplifier 11 known from the literature is represented. Here there is no need of complex optics, but the fraction of pump power captured by the doped single mode waveguide is very small, thus strongly limiting both the pumping efficiency and the output power attainable by the amplifier, due to the low LED 17 radiance.

Figure 3:
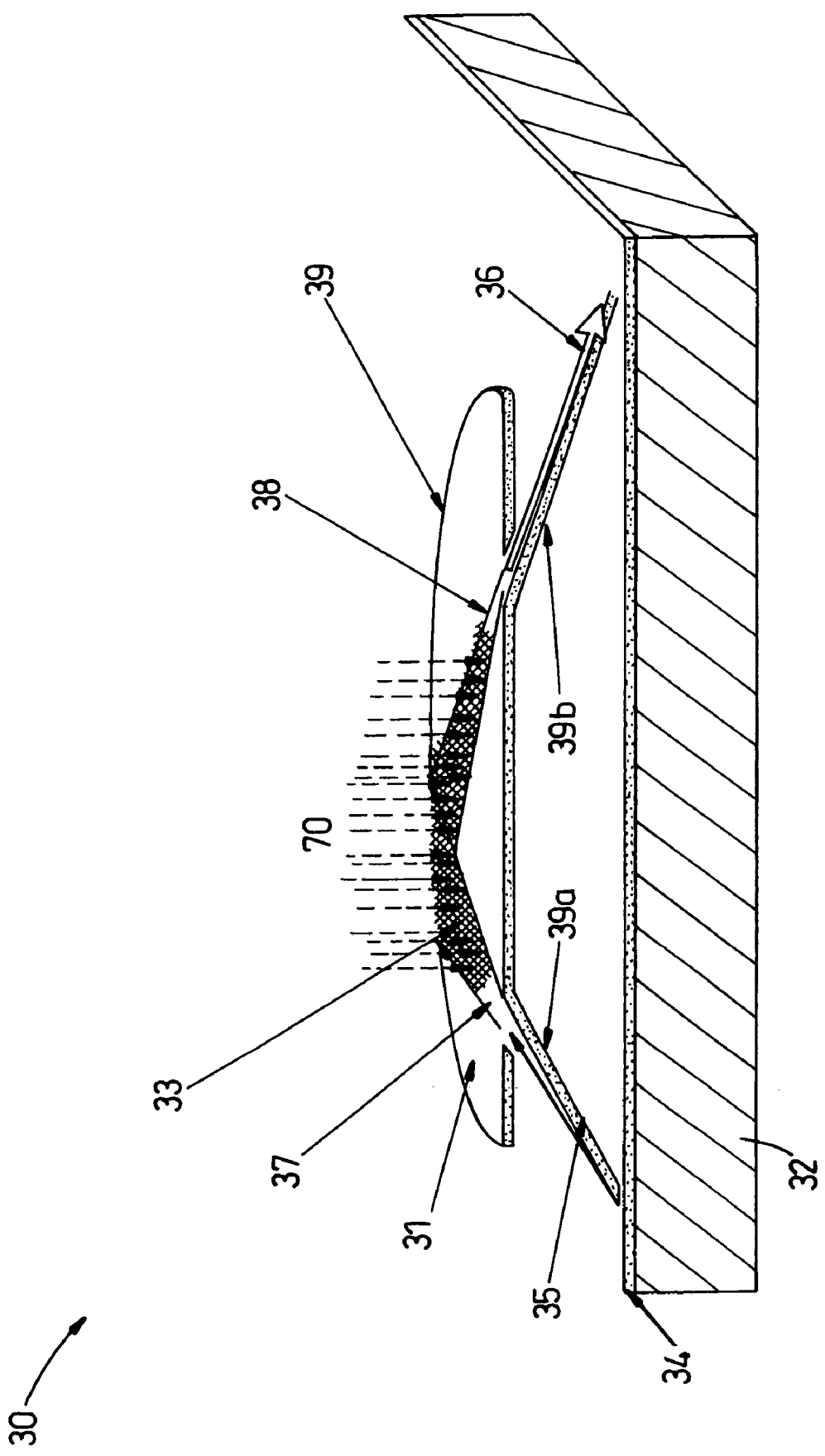
FIG. 3 shows a first embodiment of the present invention.

In FIG. 3 a schematic is shown according to the present invention of a lateral optical pumping configuration for an expanded-beam optical amplifier 30 having silicon nanocrystals dispersed in an erbium doped silica waveguide. An optical slab waveguide 31 is disposed on substrate 32. The waveguide has a lower cladding layer 34 and an upper cladding layer 44, which function to contain optical radiation traveling within the waveguide. Towards the centre of the slab waveguide is an active region 33 of silicon nanocrystals, which has typically been doped with erbium. Input 35 and output 36 waveguides are disposed at either end of the slab waveguide. The input waveguide functions to guide an input optical signal, typically at 1.53 microns, from an optical fiber (not shown) towards the slab waveguide. Once the signal reaches the slab waveguide it expands in a lateral direction due to the physical properties of the slab and input waveguides. The input waveguide can be tapered (i.e. having a gradually increasing width) in order to control the angle of expansion of the signal wave into the slab waveguide. The expanded beam 37 then traverses the active region 33 of the waveguide. A suitably shaped reflective element 39 is disposed at the edge of the slab waveguide. In this embodiment the suitably shaped reflective element is an elliptical mirror. The elliptical mirror refocuses the expanding beam 37 towards output waveguide 36. An array of LEDs 70 is disposed above the active region and irradiates the active region in a plane orthogonal to the plane of propagation of the signal, thereby amplifying the signal in a manner well known for erbium doped optical amplifiers. The LED array typically emits blue radiation at, for example 470 nm, however the wavelength can be selected according to the nature of the material disposed in the active region. In this configuration the size of the active region to be optically pumped can be matched by selecting the appropriate sized LED array as the pumping source, thus further improving the overall transfer efficiency of optical power from the relatively low power LED source to the active region. In the embodiment shown in FIG. 3 the input waveguide 35 is arranged to intersect the slab waveguide at the first focal point 39a of the elliptical mirror and the output waveguide 36 intersects at the second focal point 39b. The output waveguide can also be tapered, in order to maximize the coupling between the slab and output waveguides.

Figure 4:
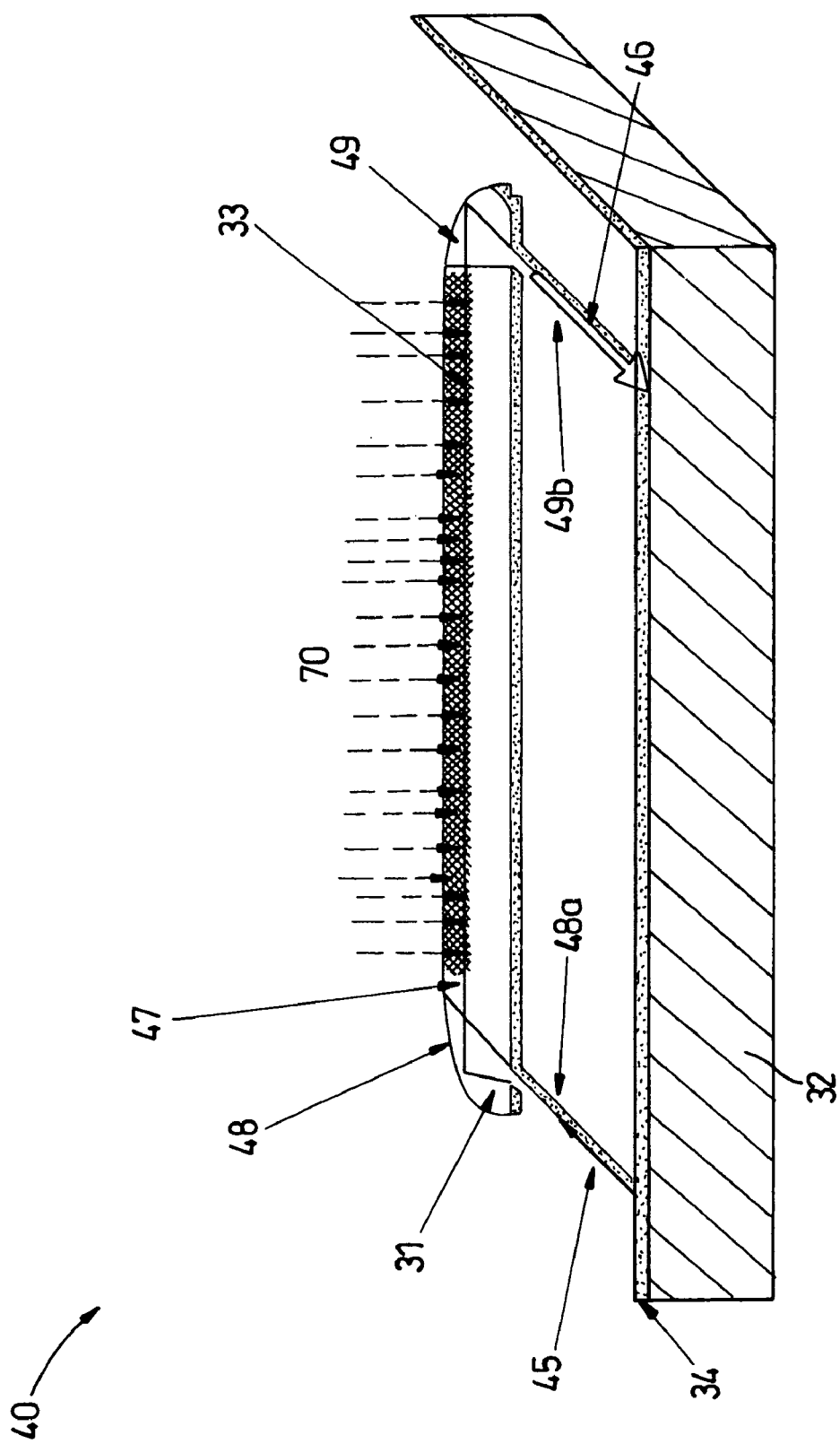
FIG. 4 shows a second embodiment of the present invention.

In FIG. 4, where parts also appearing in FIG. 3 bear identical numerical designation, an alternative embodiment of the present invention 40 is shown where parabolic mirrors 48 and 49 are used as the suitably shaped reflective elements instead of the elliptical mirror. Here, the input and output waveguides 45 and 46 intersect the slab waveguide 31 at the focal points 48a and 49b respectively of the parabolic mirrors. In this embodiment the expanding input signal beam is collimated by the first parabolic mirror 48 before traversing the active region 37 as a collimated signal beam 47 and is refocused on to the output waveguide 46 by the second parabolic mirror 49.

Advantageously in the first embodiment of the present invention the variable width signal beam 37 only intersects a reflective surface once thus limiting the losses associated with reflection off a mirror. Whereas the second embodiment suffers 2 mirror reflection losses but offers the advantage of a constant signal beam width in the active region. In both embodiments the reflective surfaces can be fabricated by etching a step to a suitable depth into the slab waveguide layer. Reflection can occur due to total internal reflection off this edge. Alternatively the vertical surface of the step can be coated with a suitably reflective material or multilayer reflecting structure.

Figure 5:
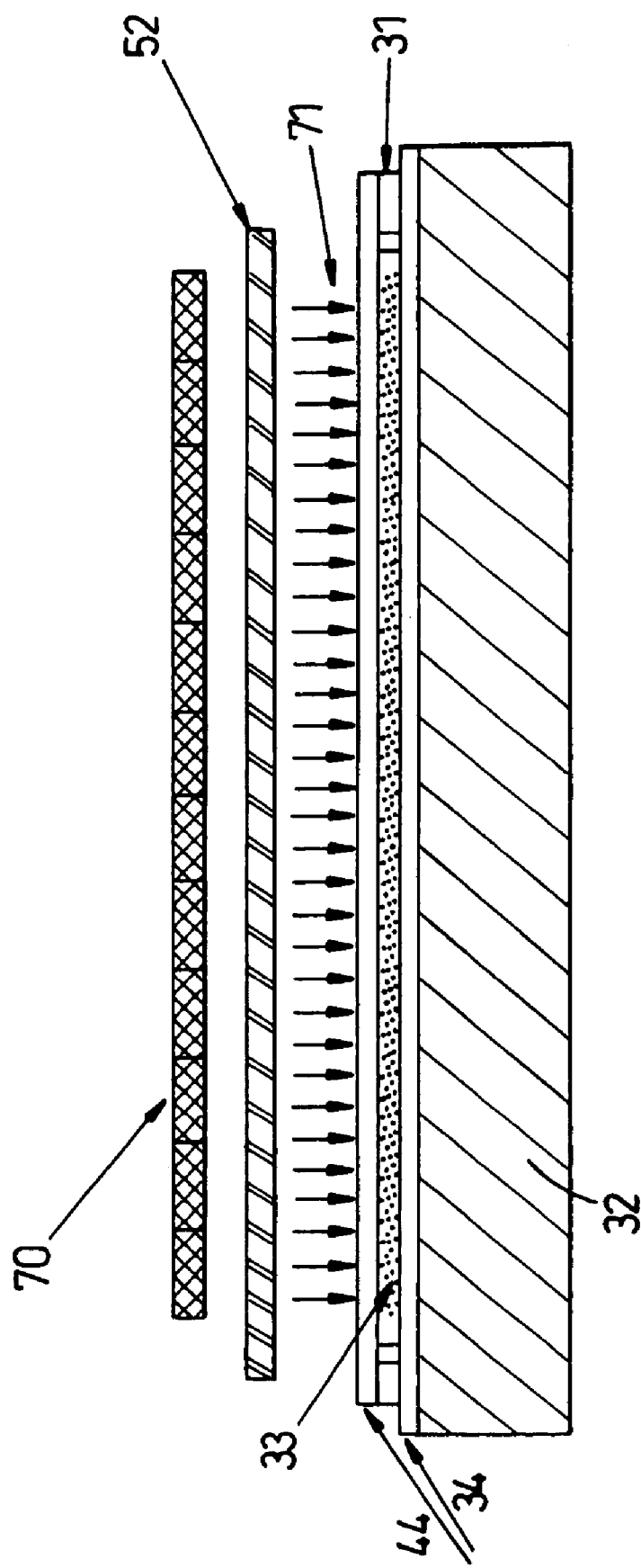
FIG. 5 shows a side view of the embodiments shown in FIGS. 3 and 4.

In FIG. 5 the LED array 70 is shown disposed above the active region 33 of the waveguide. Here both the lower 34 and upper 44 cladding layers can been seen. In addition an optical diffuser 52 can be disposed between the LED array and the active region to improve the power radiation intensity distribution by diffusing the radiation from the LED.

It is not intended that the present invention be limited to the above embodiments and other modifications and variations are envisioned within the scopes of the claims.

What is claimed is:

1. An optical amplifier comprising:
a substrate having disposed thereon an optical waveguide, the optical waveguide having an active region,
a pump source arranged to irradiate the optical waveguide with electromagnetic radiation, and
a suitable shaped reflective element for concentrating a signal into the active region of the optical waveguide, wherein the irradiation of the optical waveguide is orthogonal to the plane of propagation of the signal,
wherein the suitable shaped reflective element is arranged such that the signal under goes total internal reflection off said element.

2. An amplifier as claimed in claim 1, wherein the reflective element is formed by etching a step into the waveguide.

3. An amplifier as claimed in claim 1, wherein the step is coated with a reflective material.

4. An amplifier as claimed in claim 1, wherein the suitable shaped reflective element is an elliptical mirror.

5. An amplifier as claimed in claim 1, wherein the suitable shaped reflective element is a pair of parabolic mirrors.

6. An optical amplifier as claimed in claim 1, wherein the active region comprises silicon nanocluster erbium doped silica.

7. An amplifier as claimed in claim 1, wherein the pump source is an array of light emitting diodes.

8. An amplifier as claimed in claim 7, wherein the light emitting diode emits electromagnetic radiation in the region of 400–500 nanometers.

9. An amplifier as claimed in claim 8, wherein the light emitting diode emits electromagnetic radiation at 470 nanometers.

10. An amplifier as claimed in claim 1, further comprising an input optical waveguide and an output optical waveguide arranged to optically connect the amplifier with the signal from a communications network.

11. An amplifier as claimed in claim 10, wherein the input and/or the output waveguides are tapered.

12. An amplifier as claimed in claim 1, further comprising a diffuser disposed between the light source and the waveguide.

13. An optical amplifier comprising:
a substrate having disposed thereon an optical waveguide, the optical waveguide having an active region,
a pump source arranged to irradiate the optical waveguide with electromagnetic radiation, and
a suitable shaped reflective element for concentrating a signal into the active region of the optical waveguide, wherein the suitable shaped reflective element is an elliptical mirror, and wherein the irradiation of the optical waveguide is orthogonal to the plane of propagation of the signal.

14. An optical amplifier comprising:
a substrate having disposed thereon an optical waveguide, the optical waveguide having an active region,
a pump source arranged to irradiate the optical waveguide with electromagnetic radiation, and
a suitable shaped reflective element for concentrating a signal into the active region of the optical waveguide, wherein the suitable shaped reflective element is a pair of parabolic mirrors, and wherein the irradiation of the optical waveguide is orthogonal to the plane of propagation of the signal.

* * * * *